United States Patent
Takagi et al.

(10) Patent No.: US 7,779,882 B2
(45) Date of Patent: Aug. 24, 2010

(54) APPARATUS AND METHOD FOR MANUFACTURING RUBBER SHEET WITH REINFORCED CORD

(75) Inventors: Sigemasa Takagi, Hashima (JP); Tosiaki Morisaki, Hashima (JP); Kazumi Nakano, Hashima (JP); Yasunori Ozeki, Hashima (JP)

(73) Assignees: Fuji Seiko Co., Ltd., Gifu (JP); Fuji Shuji Co., Ltd., Gifu (JP)

( * ) Notice: Subject to any disclaimer, the term of this patent is extended or adjusted under 35 U.S.C. 154(b) by 1171 days.

(21) Appl. No.: 11/352,515

(22) Filed: Feb. 9, 2006

(65) Prior Publication Data

US 2006/0174998 A1   Aug. 10, 2006

(30) Foreign Application Priority Data

Feb. 10, 2005   (JP) .............................. 2005-035271

(51) Int. Cl.
*B29C 53/60* (2006.01)
(52) U.S. Cl. ........................ 156/427; 156/174; 156/193; 156/426
(58) Field of Classification Search ................ 156/117, 156/397, 174, 193, 195, 426, 427, 906
See application file for complete search history.

(56) References Cited

U.S. PATENT DOCUMENTS

| | | | | |
|---|---|---|---|---|
| 2,344,892 A | * | 3/1944 | Modigliani et al. ............... 57/2 |
| 3,236,711 A | * | 2/1966 | Adler .......................... 156/174 |
| 3,467,507 A | * | 9/1969 | Andreevskaya et al. ........ 65/539 |
| 3,532,580 A | * | 10/1970 | Kanao .......................... 156/432 |
| 3,558,411 A | * | 1/1971 | Beelien ....................... 428/114 |
| 3,943,224 A | * | 3/1976 | Drostholm ............... 264/209.2 |
| 4,167,429 A | * | 9/1979 | Ackley ........................ 156/174 |
| 4,511,424 A | * | 4/1985 | Usui ............................ 156/426 |
| 4,643,126 A | * | 2/1987 | Wilkinson et al. .......... 118/405 |
| 6,913,058 B1 | | 7/2005 | Takagi |
| 6,969,439 B1 | | 11/2005 | Takagi |

FOREIGN PATENT DOCUMENTS

| | | |
|---|---|---|
| JP | 53-31976 | 9/1978 |
| JP | 2001-145961 | 5/2001 |
| JP | 2002-127270 | 5/2002 |

* cited by examiner

*Primary Examiner*—Geoffrey L Knable
(74) *Attorney, Agent, or Firm*—Jordan and Hamburg LLP

(57) ABSTRACT

An apparatus for manufacturing for a rubber sheet reinforced with a cord, it consists of a first cylinder formed to wrap around a rubber coated cord on a surface of the cylinder by rotating centering an axis of the cylinder and a second cylinder that is a smaller cylinder diameter than a cylinder diameter of the first cylinder and is established in parallel aligning a cylinder axis direction to the first cylinder, spirally winding continuously a great number of rubber coated cords on the surface of the cylinder contacting with each other by transferring the rubber coated cord from the first cylinder to the second cylinder.

8 Claims, 10 Drawing Sheets

Figure 1:
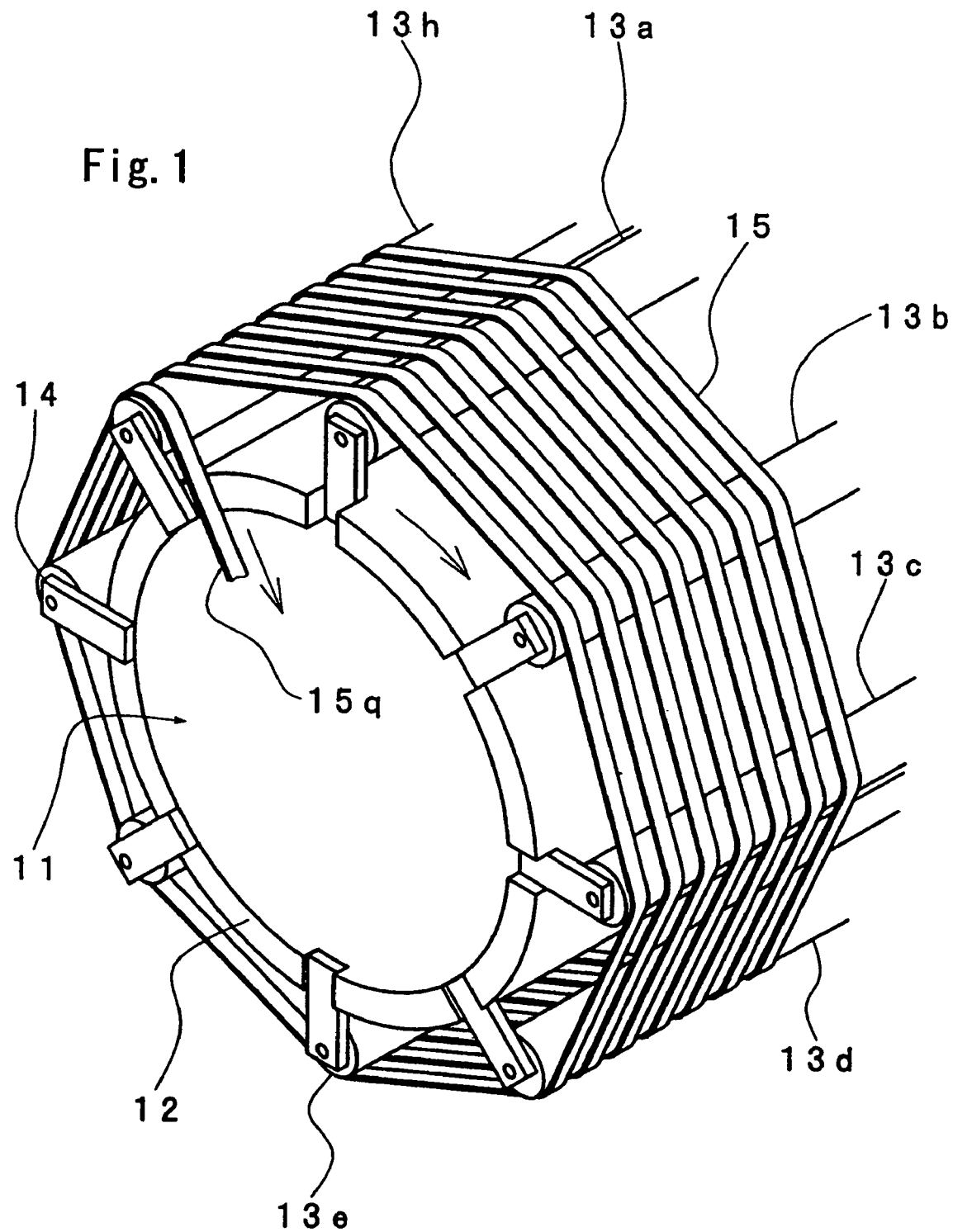

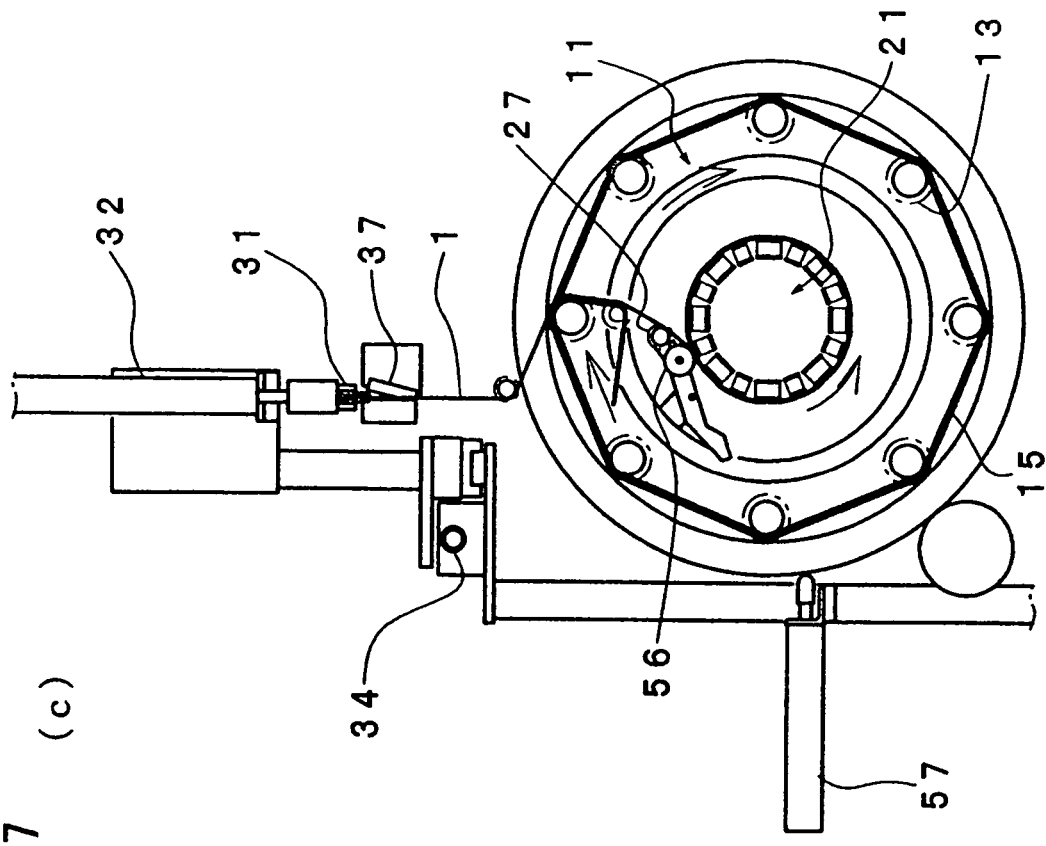
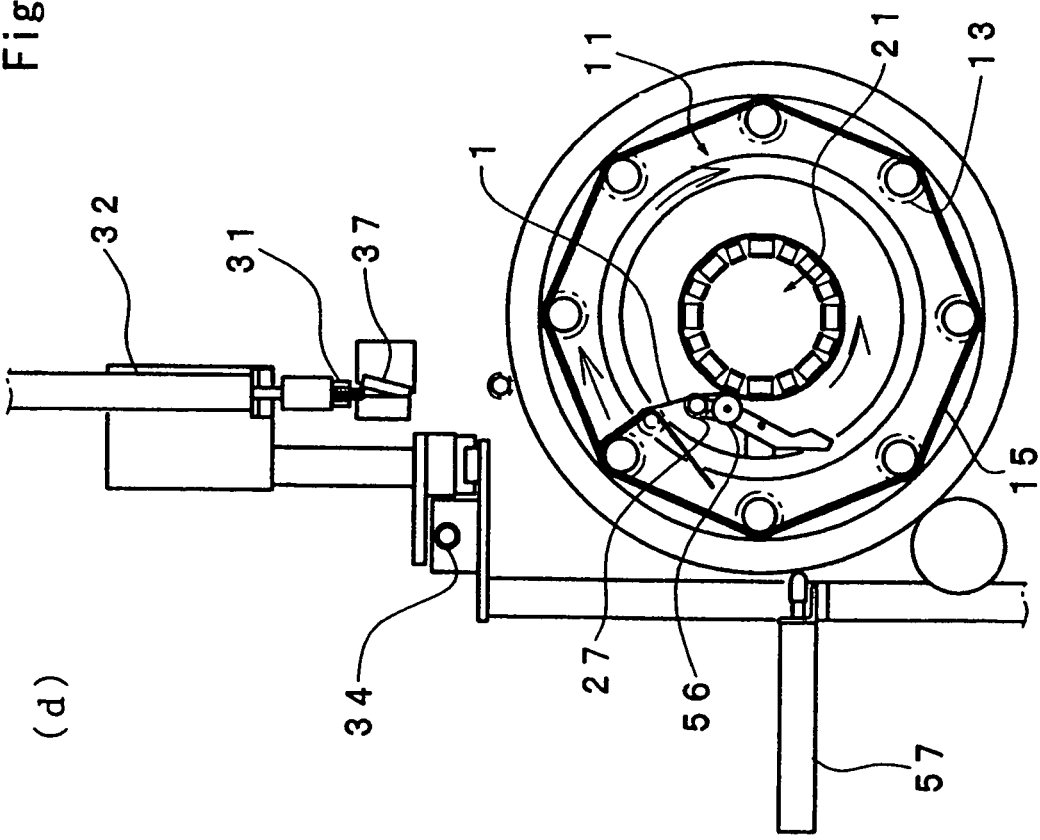
Fig.7

APPARATUS AND METHOD FOR MANUFACTURING RUBBER SHEET WITH REINFORCED CORD

1. FIELD OF THE INVENTION

The invention relates to an apparatus and a method for manufacturing a rubber sheet reinforced with a cord, especially concerns with an apparatus and a method for manufacturing a rubber sheet reinforced with a cord which is capable of high-mix low-volume production of belt material for a tire, a body-ply material, etc. by a compact apparatus variously changing arrangement angles of cord materials and a cord according to means of continuously wrapping around a rubber coated cord on a surface of a cylinder.

2. BACKGROUND OF THE INVENTION

Conventionally, manufacturing for a rubber sheet reinforced with a cord used for tires etc. has been produced by a mass and concentration production system. Necessary belt material, body-ply material, etc. were produced reeling out 1000 to 2000 cords, manufacturing large rolled goods after coating with rubber by a large calendaring apparatus, then cutting to necessary width and an angle and produced necessary belt material and body-ply material. But recently, various high functional fibers are developed for tires, fiber specifications, a fiber arrangement angle, rubber specifications, etc. of belt material and body-ply material have also required in various kinds, and to manufacture those by above mass production method, it required time, waste was large and in consequence it was not efficient.

Additionally, as it is seen in Japanese Patent Publication No. Sho 35-18602, forming a cylindrical wound body joining sides of ribbons to each other while continuously winding spirally ribbons consisting of a rubber coated cords on a large diameter roller, forming large area rubber sheet reinforced with cords, by cutting this wound body, it is also possible to cut away belt material from this sheet, body-ply material, etc. arranged a cord in predefined shapes and predefined directions, but it is a waste as a cutting residue is large. In this case, a waste is small if cylindrical body is prepared wrapping rubber coated cords on a small diameter roll and cutting it, and forming predefined shape ply material by joining several of these, but joining of sheet requires man-hours and time, and further unevenness of joined parts remain also qualitatively.

In addition, as it is seen in Japanese Patent Laid-Open No. 2001-145961 and Japanese Patent Laid-Open No. 2002-127270, there are methods of manufacturing of belt material, body-ply material, etc. by wrapping a cord reinforced rubber coated ribbon on a predefined diameter drum (or also called a mandrel) and cutting it by a predefined angle but a new drum is needed by every change of a cord angle and driving.

Conventionally, when taking a method of wrapping cords on a continuously moving conveyor, means to wrap around a rotation arm supplying cording was commonly used. But, a rotating arm had a problem to be twisted a cord to wrap a ribbon shaped cord group consist of paralleling cords of great number. But production efficiency is bad if one cord is wrapped around. So, setting up rotating arms in multiple stages, means to supply a cord to each rotating arm was taken in Japanese Patent Kokoku No. 53-31976, but those apparatuses become complicated and unable to provide an apparatus capable of manufacturing easily and conveniently by a cheap and small apparatus.

3. SUMMARY OF THE INVENTION

Problems to be Solved by the Invention

The invention is conducted to eliminate above-mentioned defects of conventional technology, the purpose resides in to enable a production system only required amount when required and that a system that can produce a high quality product simply and conveniently in manufacturing of a rubber sheet of tires etc. as is represented by TOYOTA System in automobile industry. Additionally, the other object resides in enabling to supply products of various kinds such as a kind of different cords and a kind of rubber only required amount when required by simple and convenient means. Also, the other object is to enable manufacturing of a rubber sheet reinforced with a continuous cord, which has a different arrangement angle of cords changing an arrangement angle simply and conveniently. In addition, the other object resides in to reduce a waste of discarded and not used sheet material. And, the other object resides in to provide a rubber sheet reinforced with a high quality cord of a little irregular eliminating unevenness when overlapping a ribbon on a cylinder. Also the other object resides in to save waste of time and effort to make such as to prepare belt material and body-ply material overlapping multiple aforementioned rubber sheets. Additionally, the other object resides in to provide means that ribbon shaped cord group are wrapped around on a conveyer simply and conveniently without using a rotation arm. Further, the other object is to provide manufacturing means that is simple and convenient and have good productivity with a cheap and a small apparatus.

Means to Solve the Problems

The invention relates to manufacturing of a rubber sheet reinforced with a cord. A cord in the invention includes also yarn composed of fibers, a monofilament and a cord of thin metallic wire. In addition, a shape of these cords may be multifilament consist of a long fibers, spun yarn consist of short fibers and covered yarn in which core yarn is wrapped with the other yarn and yarn called Picco ply yarn (piled yarn of different nature strand). Also fancy yarn can also be used. These cords, although use a cord already applied adhesive treatment, can be led to rubber coating means connecting to a dipping apparatus and applying dipping treatment. As for materials of a cord, organic fiber such as nylon fiber and polyester fiber, polyvinyl alcohol fiber, aramid fiber, aromatic polyester fiber and PBO (paraphenylene benzobisoxysazole) fiber, inorganic fiber such as glass fiber, alumina fiber, carbon fiber and metal fiber such as steel and amorphous metal are can also be used.

The cord used for the invention has been applied adhesive treatment that increases adhesiveness to rubber. As for adhesive treatment for a cord, attaching resorcin-formalin latex and rubber emulsion for organic fiber, after drying moisture, method to increase adhesiveness to rubber after baking resorcin-formalin is typical. Also, as for a steel cord, nickel plating, brass plating which electrodeposits cupper and zinc, zinc plating mainly zinc, etc. are applied. Further, as for metal fiber, a means of adhesive treatment etc. using cobalt and molybdenum, silane coupling agent, etc. also can be used. These adhesive treatments are selected appropriately from a kind of cord, a kind of rubber, required adhesion, etc. and are not limited to examples illustrated here.

In addition, as rubber used for the invention, not only rubber used after vulcanization such as natural rubber and synthetic rubber, but also rubber no need to be vulcanized called thermoplastic elastomer such as polyurethane and SBS (styrene-butadiene-styrene rubber) can be used. These cords and rubber are selected appropriately depend on use application of an intended rubber sheet. A rubber coated cord is said to one coated with rubber described herein on the above-mentioned cord. Coating of rubber uses means to coat rubber extruded from rubber extruder to a cord in a die but can also use a method such as attaching rubber processed by a calender and a method of drying rubber solvent after coating adhesive latex to a cord.

The invention relates to manufacturing means for a rubber sheet reinforced with a cord according to continuously wrapping a rubber coated cord on a cylinder surface. A cylinder is an approximate cylindrical body of cylinder shape or roll shape. The invention concerns with means for manufacturing a cylindrical rubber sheet by sticking fast a rubber coated cord with each other and spirally winding with a constant angle $\theta$ on the cylinder surface. A rubber coated cord in the invention may be a cord but is desirably a ribbon that plural rubber coated cords are parallel and sticking fast. In addition, when it is formed that the cylinder forms a conveyer and proceeds to a definite direction, usually supplying a cord is by a rotation arm. If cords are a ribbon shape and have width, they do not become a pretty product as a ribbon is twisted. But in the invention, there are characteristics being able to make a product disposed cords orderly if a ribbon has width that productivity is good although a simple and convenient manufacturing method.

A cylinder of the invention is a columned form, and comprises a portion consist of a circular plane and a side surface consist of a curved surface. And the column forms a circular bottom surface and a cylindrical side surface (hereinafter called a cylinder surface). Moreover, a circle of a circular bottom surface may be an ellipse and a polygon not meaning strictly a circle. When it is a polygon, a column forming the cylinder of the invention is a polygon rather than a cylinder. But in the invention, these cases are described as a cylinder.

A cylinder of the invention is characterized in that a first cylinder and a second cylinder are established in parallel corresponding to an axis direction of each cylinder. And a diameter of the first cylinder is lager than that of second cylinder. And the first cylinder can to rotate centering the axis of the cylinder. The second cylinder forms a conveyer by enabling continuously moving the cylinder surface to an axis direction the cylinder.

In the invention, it is characterized in that this first cylinder is formed to rotate centering a cylinder axis. According to rotation of this first cylinder, a rubber coated cord supplied from a cord supply guide is wrapped on the surface of the first cylinder. A rubber coated cord to be wrapped the first cylinder is not necessary be wrapped orderly. But, in order to improve productivity, and that to reduce deformation of an edge portion of a ribbon, and to improve a product shape of a cylindrical rubber sheet, it is preferable to cycle on the first cylinder placing a rubber coated cord on a spiral cycling belt as described below. And so, a rubber coated cord is spirally wound orderly on a surface of the first cylinder by a cord supply guide is movable to an axis direction of the first cylinder at constant speed.

The first cylinder is preferable to be formed of small rollers group of plural number (preferably 3 to 12, further preferably 6 to 8) disposed in Nelson rollers arrangement with each other disposed to a periphery in almost parallel. And, a belt (hereinafter called a spiral cycling belt) cycles spirally on the rollers group. The spiral cycling belt moves spirally on small rollers group and cycles returned through the other channel to the end of the first roller when it goes to the one end of rollers group by driving all of those small diameter rollers group or several of them. Still, driving of the spiral cycling belt may be conducted by driving above-mentioned small diameter rollers group but a belt itself may be driven by a belt through the other pulley etc. Also, it is preferable that a groove is cut on each roller of small diameter rollers group, and a belt is made to be guided along the groove to define accurately a running position of a spiral cycling belt on a small rollers group. The first cylinder is rotating centering an axis of a cylinder and a cord supply guide moves along a side surface of the first cylinder. And a rubber coated cord supplied from there is winded on the first cylinder placed on the cycling spiral cycling belt. A rubber coated cord placed on the spiral cycling belt is carried to the end of the second cylinder side of the first cylinder along moving of the spiral cycling belt.

A rubber coated cord wrapped on the surface of this first cylinder is moved to the second cylinder as go into detail below. This second cylinder is coaxial with a cylinder axis of the first cylinder and an outer diameter is smaller than the first cylinder. And, a surface of the second cylinder forms a conveyer to enable moving to an axial direction of a cylinder. A means to form this conveyer can also be conducted by a method of cycling a cylindrical rubber sheet among ring shaped rollers. But as the most preferable embodiment, it is realized to be composed of belts of plural number (hereinafter called an axial direction cycling belt) are driven and cycled to an axial direction on a surface of a cylinder. A rubber coated belt to be wrapped around the first cylinder, firstly, has been joined an edge portion of the rubber coated cord to the conveyer of the second cylinder. And, rubber coated cords that is wound to the first cylinder have been carried to an edge portion of the first cylinder by a spiral shape cycling belt of the first cylinder. The first cylinder rotates an axis of a cylinder as the center and in the second cylinder as an edge portion of a rubber coated cord is joined, a rubber coated cord wrapped around on the first cylinder is wrapped on a surface of the second cylinder. And, a cylindrical rubber sheet is formed by spirally wrapping a rubber coated cord contacting with each other on the second cylinder by a conveyer action of the second cylinder and is carried to an axial direction of the second cylinder.

Although the end of a rubber coated cord is joined to a surface of the second cylinder at the beginning, this joining can be made by an adhesive agent and using adhesive tape etc., in any event, it is a joining like temporally fixing and preferably one to be peeled off easily.

A rubber coated cord is led to the first cylinder and the second cylinder by a cord supply guide. For a cord supply guide, a comb, a yarn guide, a roller, a roller guide cut a groove on a roller, etc. is used. And this cord supply guide is put on a moving apparatus that can move side surfaces of the first cylinder and the second cylinder to an axis direction of cylinders. The moving device, in which cord supply guides are supported by rails or screws, are moved by motor etc. The cord supply guide, in a situation that it is not gripped by a gripper hereinafter described, can be combined with a yarn guide which has a shape of an open groove spaced a constant interval.

A cord supply guide is preferably equipped with a gripper. A rubber coated cord of the invention is gripped by a gripper, first of all, is joined guided to a surface of the second cylinder. And, this gripper is used for gripping a rubber coated cord to conduct easily cutting work when cutting a rubber coated cord with a cutter after a rubber coated cord is wound to the first cylinder a specific amount. Further, this gripper is used also for guiding to a next device gripping a rubber coated cord supplying to the cord supply guide by the gripper in a switching over work hereinafter described when using plural of the rubber sheet manufacturing apparatus switching over.

A cord supply guide is preferably equipped with a cord cutter. A rubber coated cord or a ribbon which is the parallel arrangement body of the invention is cut by a cutter after winding a specific amount to the first cylinder. And, for this cord cutter, cutters of razor blade, score-cutter, a shear cutter, etc. is used. These cord cutters are automated and it is preferable to be cut gripped by a gripper after winding a specific amount of a rubber coated cord. Moreover, a specific amount of rubber coated cord is said to a rubber coated cord of quantity to be a length of an objective cylindrical rubber sheet.

The second cylinder of the invention has desirably a presser tool to press a formed cylindrical rubber sheet. The presser tool equalizes an arrangement of a rubber coated cord of a cylindrical rubber sheet, ensures further a joining of each other rubber coated cord and smoothes a surface of a rubber sheet. Pressing can also be conducted by pressing a roller etc. directly to a cylinder.

The second cylinder of the invention is preferably rotating centering a cylinder axis as the whole of the second cylinder. And, a cylindrical rubber sheet formed by wrapping a rubber coated cord to a cylinder can cut through spirally by having a means to cut away spirally by a cutter. The cylindrical rubber sheet can be a product cutting to a predefined length as a cylindrical sheet by itself. But, rubber sheet arranged a cord to predefined angle α against a longitudinal direction of a sheet can be taken out according to cutting through this cylindrical rubber sheet with a cutter and cutting away spirally by relation between velocity of a conveyer and rotation velocity of a cylinder itself. A cutting place is, although it can be conducted on a conveyer, but not to injure a conveyer, preferably conducted at a place where it leaves a conveyer. By providing a cutter united with an above-mentioned presser tool where it leaves a conveyer, an apparatus becomes compact. As for a cutter, various types are used such as a razor blade, a rotating blade and a receiving roller, a press cut by above and bottom blades, a shear cutter and a laser beam. Moreover, it is desirable that a rotating direction of the aforementioned second cylinder is an opposite direction of a rotating direction of the first cylinder. But an arrangement angle α1 of a cord of a product obtained by a rotation of opposite direction and an arrangement angle α2 of a cord of a product obtained by a rotation of a same direction can also be formed and shaped to make a symmetric angle to a long longitudinal direction of a sheet.

A cord arrangement angle α against a longitudinal direction of sheet in a rubber sheet disposed a cord after spirally cut through, is defined by a cylinder diameter of a cylinder, rotation number of a cylinder, a spiral angle θ when a ribbon is wrapped to the second cylinder, etc. Width of a rubber sheet reinforced with a cord in the invention is defined by a diameter of a cylinder. An arrangement of a cord of predefined angle α is selected from in a range of, for example, 80 to 90 degree against a longitudinal direction for a body-ply sheet of a radial tire, 10 to 35 degree preferably 15 to 30 degree for a belt material for a tire. Here a sheet for a body-ply is a carcass sheet to be a framework of a radial tire, a bias tire, a belted-bias tire, etc. A sheet for a belt, in a radial tire, a belted-bias tire, etc., has what we call "hoop effect" arranging thickly in approximately a perimeter direction a strong and not easy to extend cord. In the other, there is one called a breaker in a rubber sheet reinforced with a cord used for a tire and is included in a rubber sheet reinforced with a cord of the invention.

Meanwhile, a diameter of a cylindrical rubber sheet in the invention can be varied by changing an outer diameter of the second cylinder. For example, it can be realized according to conducting also by providing a hole that determines setting place of a small diameter rollers group in a mulchstage. But, regarding a means to conduct more simply and conveniently with high accuracy, it shall be described in an explanation of FIG. 5.

A rubber coated cord in the invention preferably guided to a cord supply guide of the invention continuously producing a rubber coated cord according to a cord applied with an adhesive joining treatment for a rubber reeled out from a reel (or a bobbin) passes through a rubber coating die coating rubber extruded from a rubber extruder. And, not only complicated and space-occupying processes that are unreeling, winding and storage of a cord when coating a rubber in a separate step are not necessary but a waste when unreeling cord and at a winding core are decreased. And, dirt of a cord is less as a cord has no chance to be taken up, it becomes excellent one qualitatively as chemicals are not bloomed and a fresh rubber coated cord can be used.

When connecting a rubber coating apparatus to an apparatus which has a cylinder and a cord supply guide, it is preferable to install a tension adjusting apparatus that keeps constant tension of a cord guided to a cord supply guide. A rubber extruder needs time to be constant output of rubber. Accordingly, for operating an apparatus of the invention stably without wasting a rubber coated cord during that time, it becomes necessary to vary supplying velocity of a cord and/or to respond without stopping an extruder in a small trouble in a forming apparatus for a rubber sheet reinforced with a cord. Adjustment of tension is conducted storing to an accumulator (or a festoon device) without changing velocity of a cord supplied to a rubber coating apparatus by a means to detect a position of a dancer roller and a means such as detecting tension itself electrically providing a dancer roller.

In the invention, when a rubber coated cord is wound on both cylinders only a specific amount, a cord is cut but to stop extruder etc. of rubber coating step by that reduces productivity. In the invention, a manufacturing apparatus rubber sheet reinforced with a cord is arranged plural sets in parallel, after a rubber coated cord is cut in set No. 1 in a situation gripped by a gripper of a supply guide, this is moved to the other set and production of the set is started attaching it on a surface of the second cylinder. According to plural production sets are used in series by rotation like this, a supply site of extruder etc. of a rubber coated cord can continue production without interruption that productivity is not reduced. In this case, a tension adjusting apparatus and an accumulator between rubber coating dies and a cord supply guide are useful also for keeping tension constant when moving to the other set from this set No. 1.

And, a cord applied adhesive treatment to rubber unreeled from a reel etc. in the invention, unreeling giving a twist by a twister or an assembly winder, is also possible to be guided to a cord supply guide of the invention. A means to give a twist to a cord usually a twister is used. A twister is to give twist to a cord and the one twisting while doubling cords of plural number is also included. In addition, a principle of a ring spinner, a spinning mule, etc. used for fine spinning machine of short fibers can also be used. A twister is based on a ring twister but depending on a type, an up-twister, a double-twister, a flyer spinning frame, Italian-type twister, a covering-type twister, etc. can be used, and an old type such as Hatcho twisting machine etc. can also be used. A twister in the invention is preferably one in which a cord is twisted while unreeling and the most preferably the one combined with an unreeling machine and a twister of a cord.

Advantageous Effects of the Inventions

The invention provides a method that can eliminate inefficiency, material and a waste of time in conventional mass production system method and can produce simply and conveniently only the needed quantity when needed and that a high quality product regarding manufacturing of a rubber sheet reinforced with a cord used for a tire etc. Also, it is possible to offer only the needed quantity when needed products of various kinds such as a kind of various cords and a kind of rubber by simple and convenient means. Additionally, a rubber sheet reinforced with a continuous cord differing in a cord arrangement is made possible to manufacture by changing cords arrangement angle simply and conveniently. In addition, it is possible to decrease a waste of discarded and unused sheet material. Also, a waste of time and effort to make such as conventional overlapping a great number of the sheets for ply can be eliminated in the invention. In addition, conventionally, in a case a method of splicing a cord to a continuously moving conveyer is taken, a means to splice supplying cords to rotation arm was a popular but a rotation arm has a problem that a cord is twisted for splicing a cord group of ribbon shape consisting of a great number of cords in parallel. While on the other hand, in the invention to wrap a cord group of ribbon shape on a conveyer simply and conveniently without using a rotating arm is made possible. As a result, productivity has improved dramatically by wrapping a wide ribbon of a great number of cords with one blow. Further, the invention makes it possible to offer manufacturing means that is simple and convenient and has good productivity by an inexpensive and small apparatus.

Industrial Applicability

A rubber sheet reinforced with a cord of the invention is use for a sheet for a body-ply of a tire, a sheet for a belt, etc. but also used in a field of a rubber sheet that is required strength in the other industrial machine etc. such as air spring, a diaphragm, a belt-conveyer and a flexible container.

The above and other objects, features and advantages of the present inventions will become apparent from the following description with reference to the accompanying drawings which illustrate examples of the present inventions.

4. BRIEF DESCRIPTION OF DRAWINGS

FIG. 1: A perspective view of a first cylinder of the invention.

Figure 2:
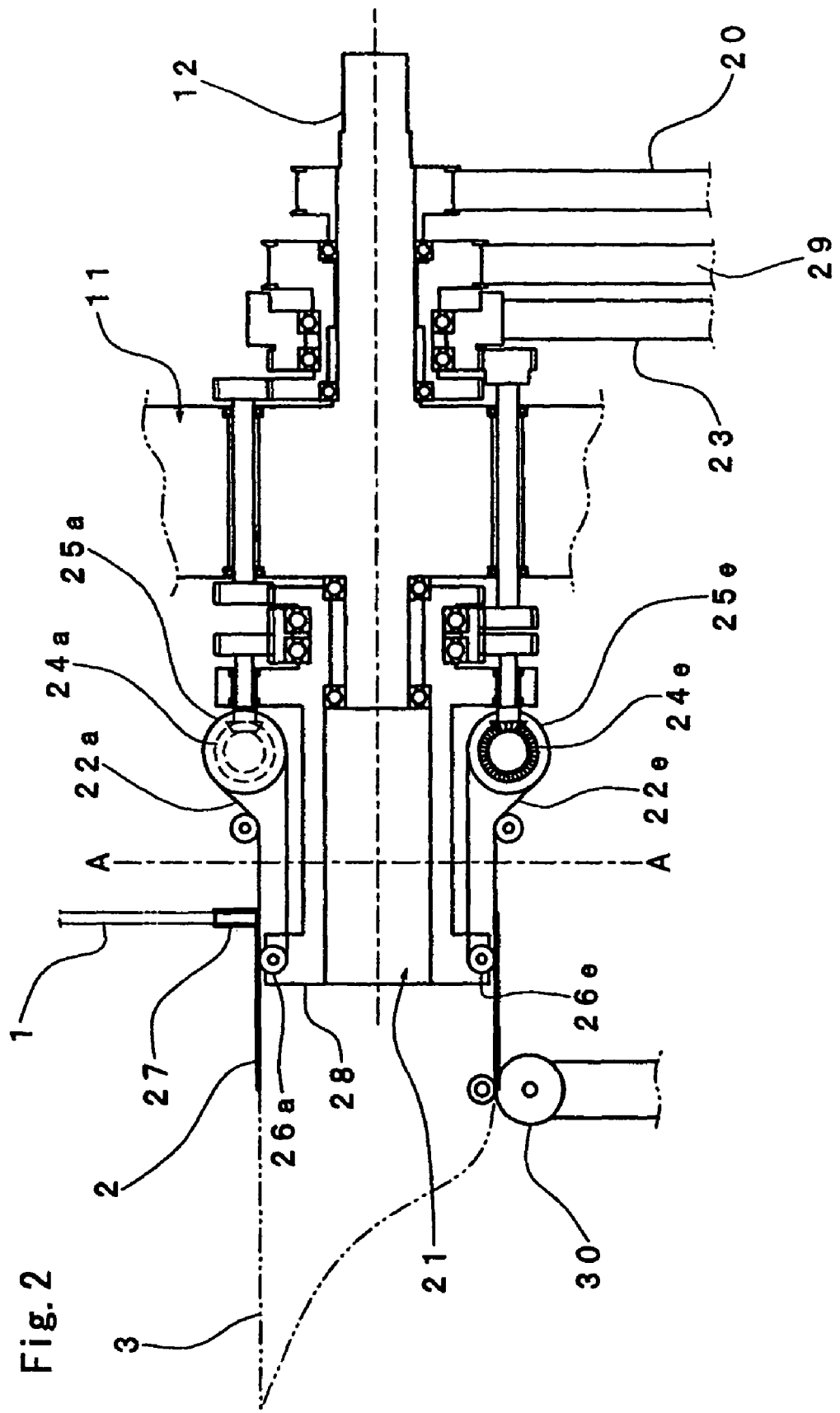

FIG. 2: A cross sectional view seen from a side surface of a second cylinder of the invention.

Figure 3:
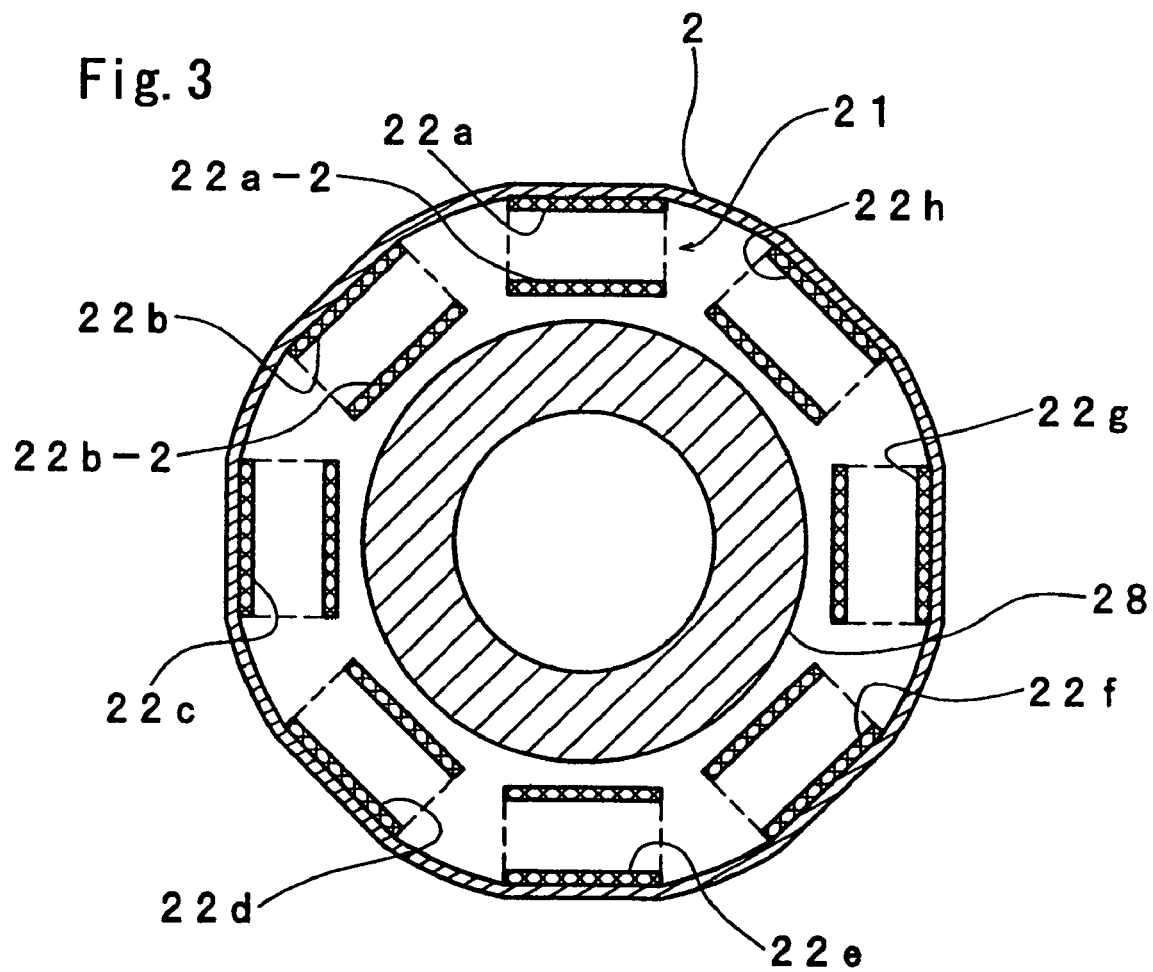

FIG. 3: A cross sectional view at A-A surface of FIG. 2.

Figure 4:
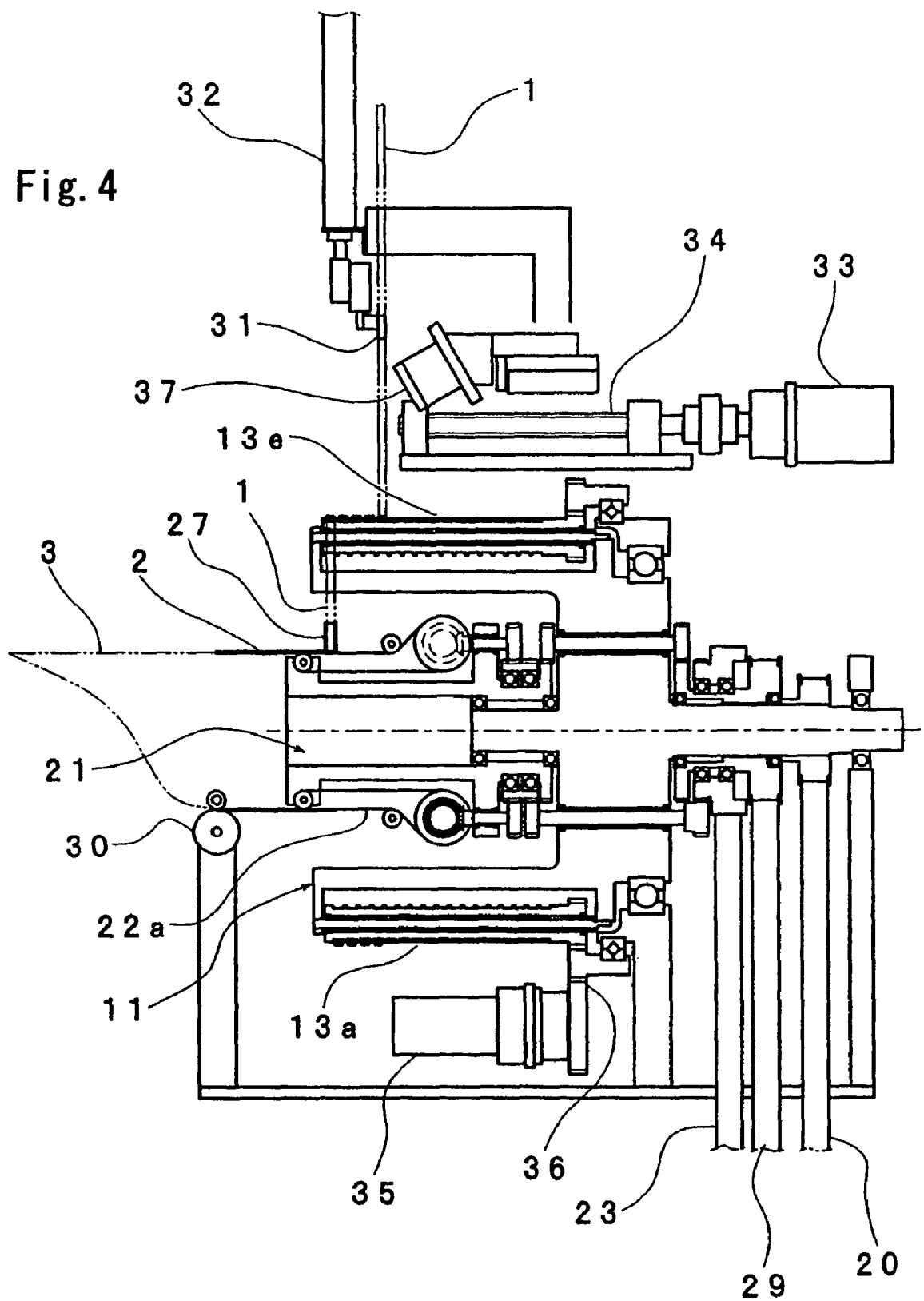

FIG. 4: A cross sectional view seen from a side surface of a manufacturing apparatus for a cylindrical rubber sheet of the invention.

Figure 5:
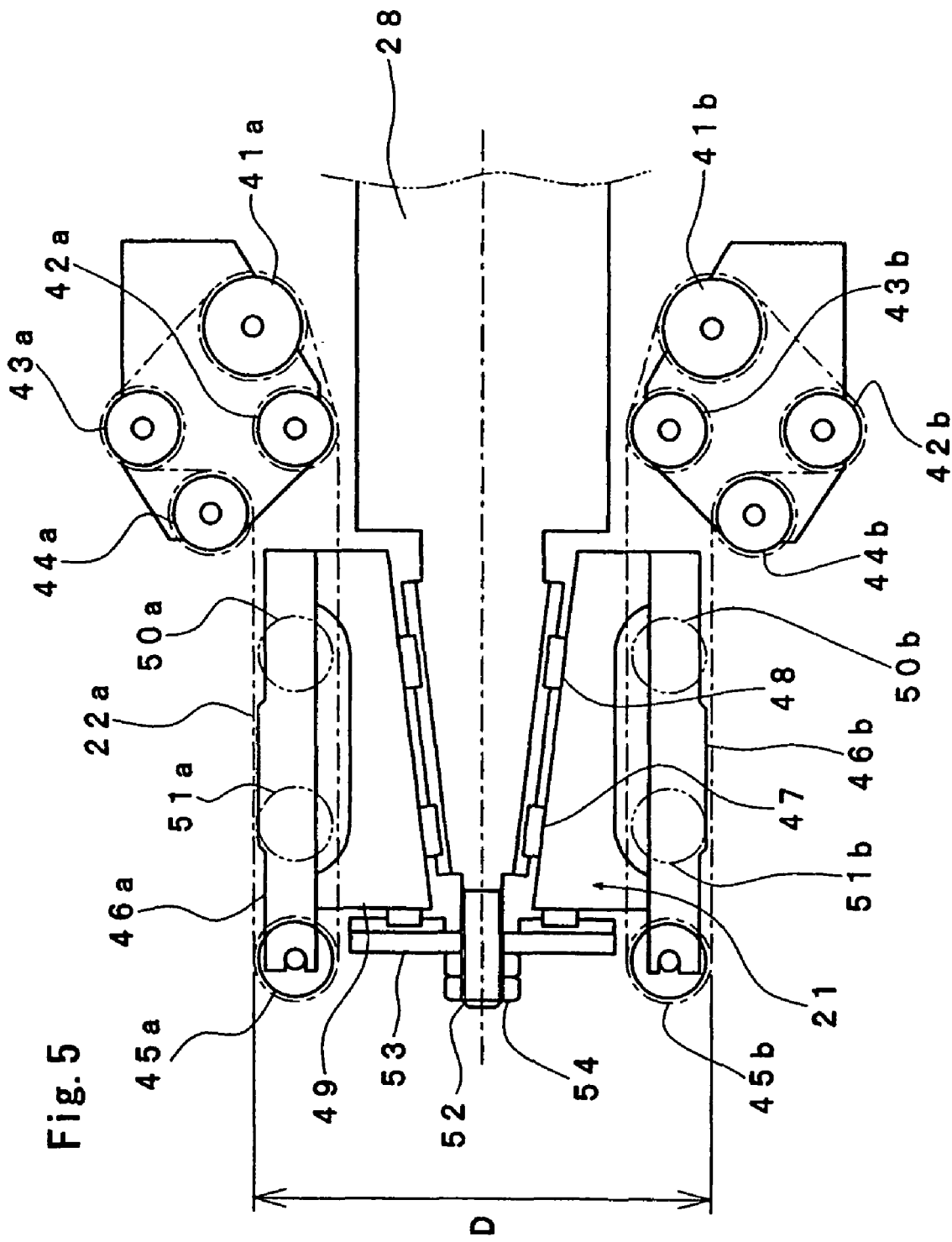

FIG. 5: A side view of an apparatus illustrated an example of means changing an outside diameter of a second cylinder of the invention.

Figure 6:
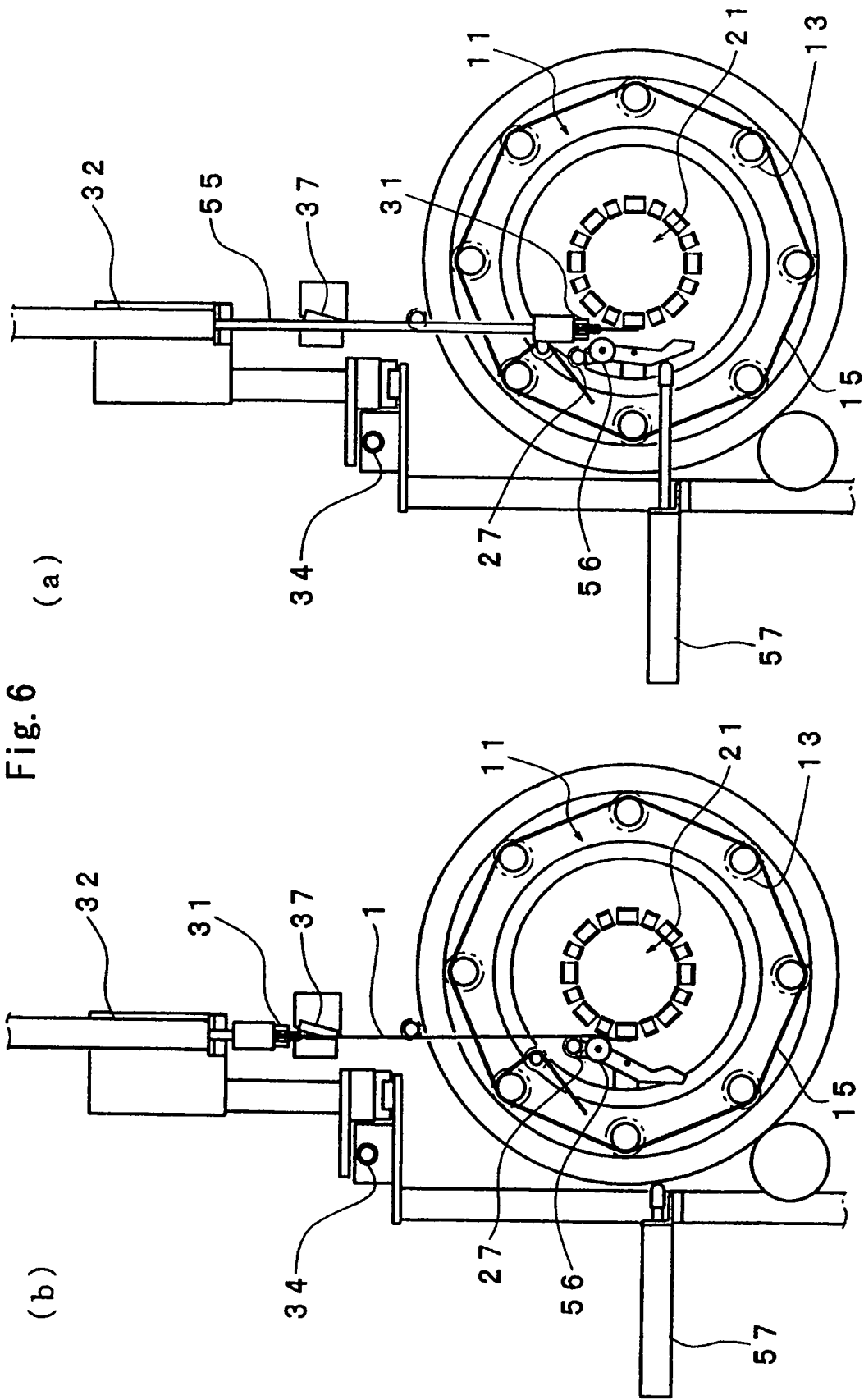

FIG. 6: A cross sectional view of an apparatus illustrated a manufacturing step for a rubber sheet of the invention in each step.

FIG. 7: Following to FIG. 6, a cross sectional view of an apparatus illustrated a manufacturing step for a rubber sheet of the invention in each step.

Figure 8:
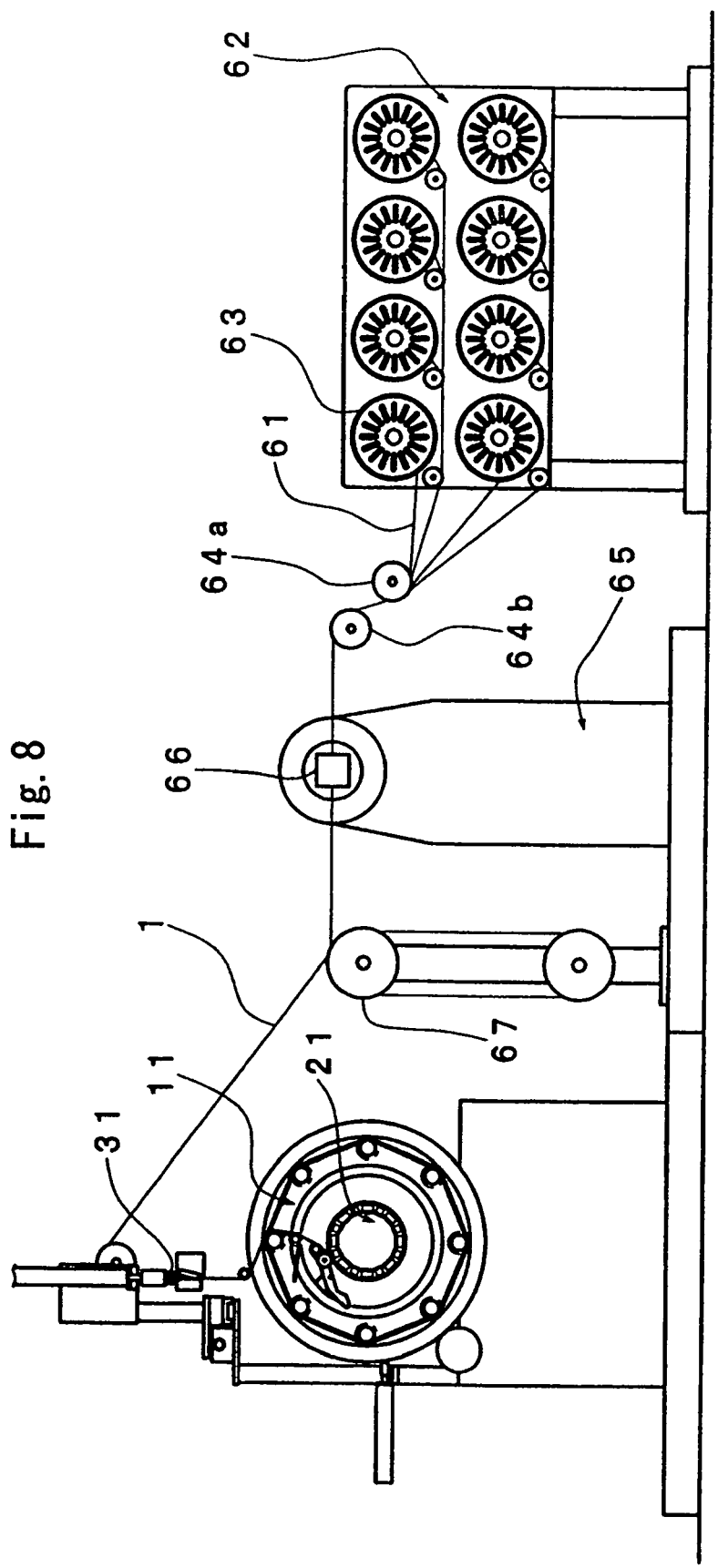

FIG. 8: An example that is connected unreeling, rubber coating and a rubber sheet forming apparatus in a manufacturing step for a rubber sheet reinforced with cords of the invention, and is illustrated in a cross sectional view.

Figure 9:
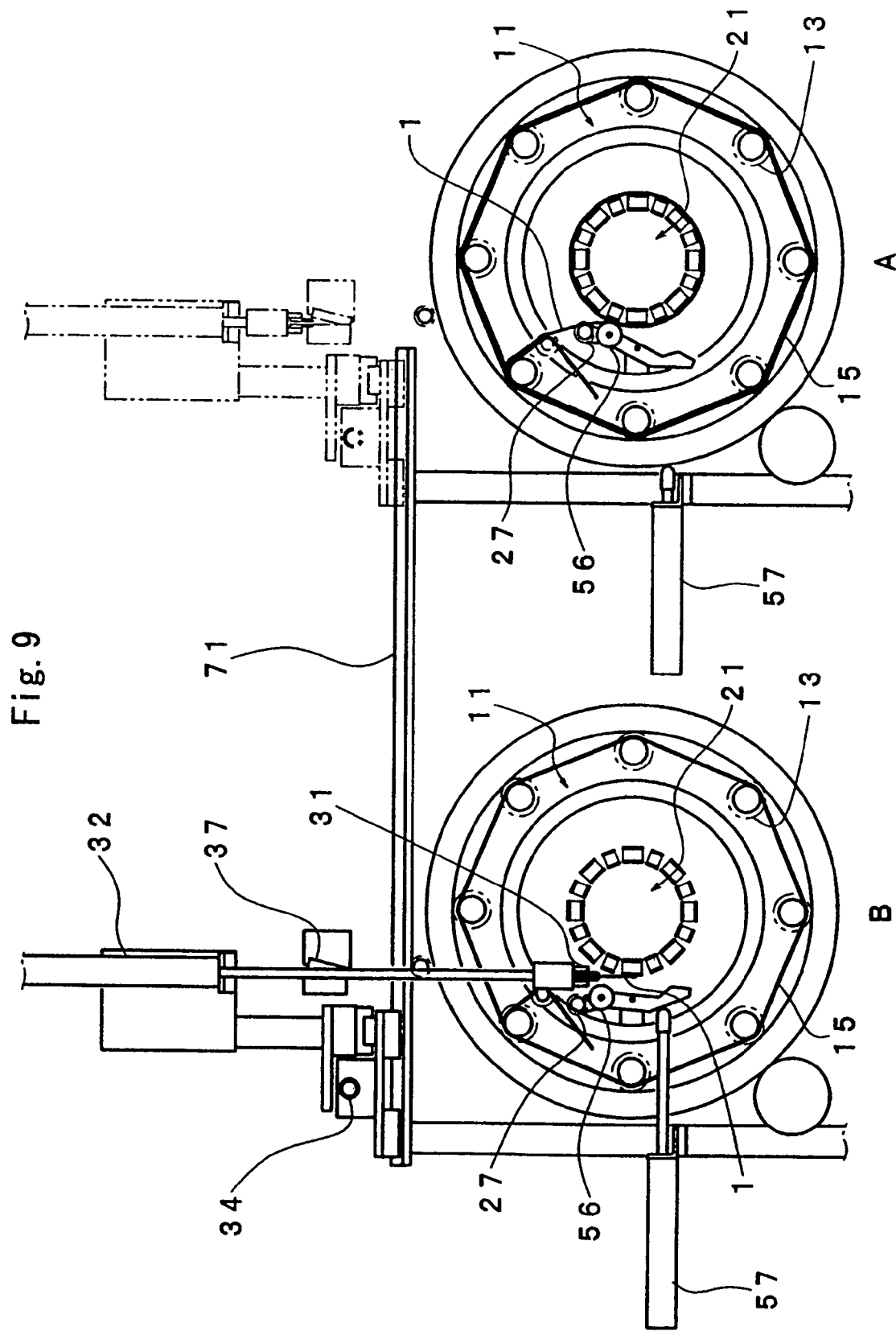

FIG. 9: A cross sectional view of an apparatus illustrating an example put in parallel manufacturing apparatuses for a rubber sheet reinforced with a cord of the invention.

Figure 10:
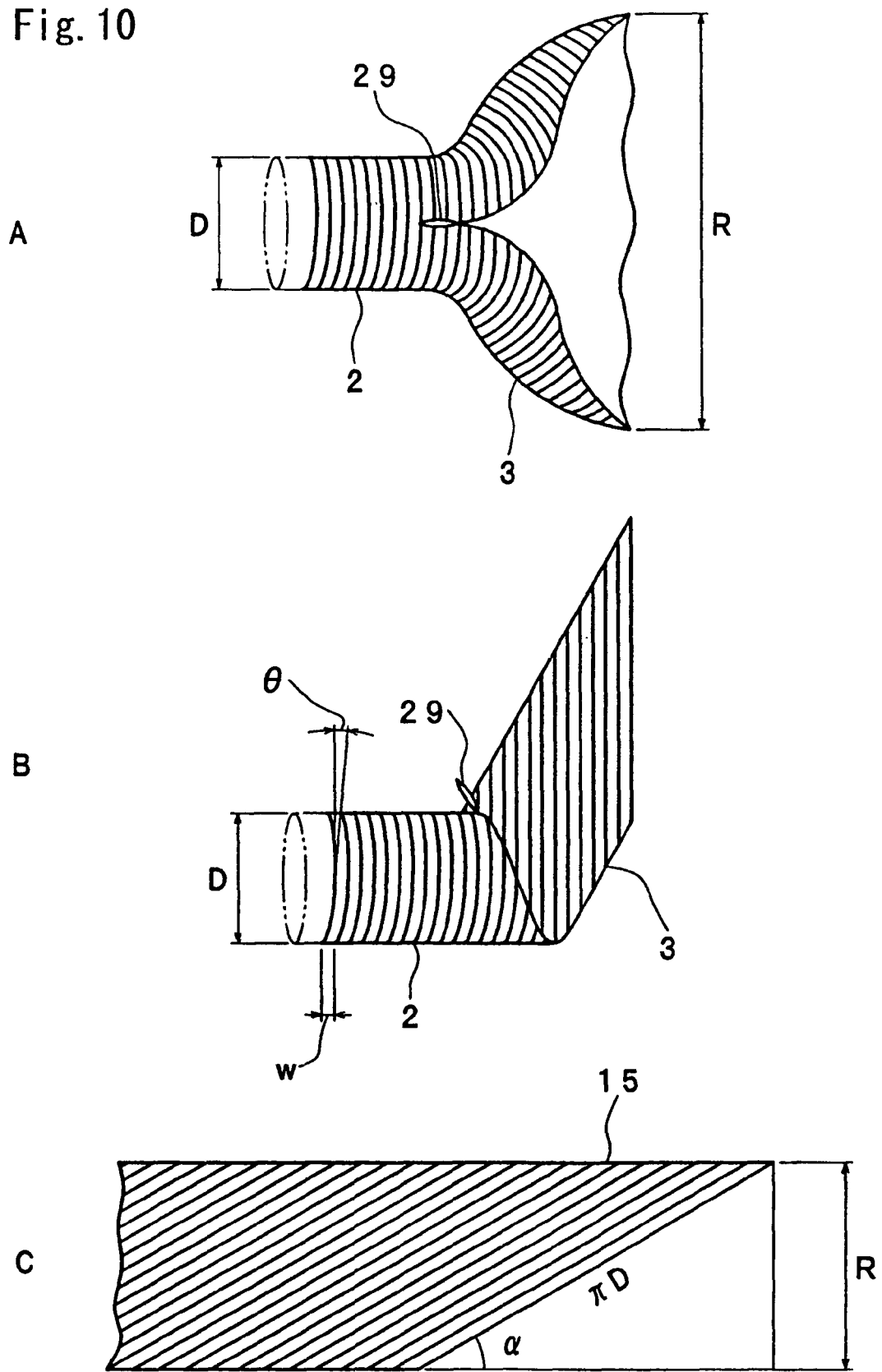

FIG. 10: Cutting through a cylindrical sheet consist of a rubber coated cord of the invention, illustrates an arrangement status of a cord depending on a cutting through method when manufacturing a rubber sheet reinforced with a cord.

5. DETAILED DESCRIPTION OF THE PREFERRED EMBODIMENT

In the following, the invention is described based on embodiments shown by drawings. The invention consists of a manufacturing apparatus for a cylindrical rubber sheet in which a first cylinder, a second cylinder and a cord supply guide are main component. It is described for the first cylinder in FIG. 1 and for the second cylinder mainly in FIG. 2 and FIG. 3. And, in FIG. 4, the whole of a manufacturing apparatus for a cylindrical rubber sheet that is combination of these is described.

FIG. 1 is a perspective view of a first cylinder. The first cylinder 11 has a first drum 12 and a ribbon may be wrapped around to it directly. But in order to be wrapped on the first cylinder 11 not untidily, further small diameter rollers (8 rollers in the drawing) 13a, 13b, 13c, - - - , 13h are provided on an outside of the fist drum 12 in an axial direction of the cylinder 11, and fixed by holddowns 14 to the first drum 12. A small diameter rollers group 13 is disposed making a certain angle to an axis of the first drum 12 in an arrangement of Nelson rollers with each other. And a spiral cycling belt 15 is disposed to cycle spirally on this small diameter rollers group 13. A spiral cycling belt 15 tries to enter in a right angle direction to a small roller 13b when moving from a small diameter roller 13a to a small diameter roller 13b as a small diameter rollers group 13 is inclined a little bit by the arrangement of Nelson rollers. So that a spiral cycle belt 15 can transfer on a small rollers group 13 spirally. And a spiral cycle belt 15q at the end of a small diameter roller 13h in a portion apart from a small diameter roller is cycled passing the other pathway by guided to the other end at a time of starting of a small diameter roller part. As for a small diameter rollers group 13, a grooved roller molded a groove correspond to width of a spiral cycle belt 15 is preferable, a move becomes smooth by moving a spiral cycle belt 15 guided by this groove. Also, the first drum 12 and the small rollers group 13 (not necessary to be all, may be a portion of it) are preferably driven. But, the spiral cycle belt 15 can also drive the spiral cycle belt 15 by a pulley etc. at a point where passing the other pathway apart from a small rollers group 13 in stead of driving of the small rollers 13 group.

FIG. 2 is a side view of an apparatus illustrating constitution of the first cylinder and the second cylinder of the invention. The first cylinder 11 and the second cylinder 21 are established in parallel on the same cylinder axis (a chain line of a drawing). The first drum 12 of the first cylinder 11 is formed to rotate centering the cylinder axis receiving drive of a timing belt 20. The second cylinder 21 is formed to be surrounded circumferentially by cycling an axis direction cycle belt 22a, 22e, etc. and it is formed to move a surface of a cylinder to an axis direction by the cycling. An axis direction cycling belt 22a and 22e are driven by a timing belt 23, cycling between rollers 25a and 26a and between rollers 25e and 26e through bevel gear 24a and 24e. A ribbon 1 wound on the first cylinder 11 is being wound on a conveyer that an axis direction cycling belt 22 guided on the second cylinder 21 by a roller guide 27 according to the first cylinder 11 is rotating. Also, the second drum 28 that bevel gear 24, a roller 25, a roller 26, etc. are supported is rotating centering an axis of a cylinder (a chain line of a drawing) of the second drum 28 receiving drive by a timing belt 29. A rotation direction of the first drum 12 of the first cylinder 11 and the second drum 28 of the second cylinder 21 is preferably a reverse direction.

A ribbon 1 wound on the second cylinder 21 forms a cylindrical rubber sheet 2 consisting of a rubber coated cord group spirally wound contacting with each other by an axial direction transfer action of an axial direction cycling belt 22. The cylindrical rubber sheet 2 is spirally cut away by cut through action of rotation of the second cylinder 21 itself and cutter 30 (a rotary blade of score cutter and a receiving roller in a drawing) and becomes a rubber sheet 3 disposed a cord in a certain direction.

FIG. 3 shows a cross-sectional view of the line A-A of FIG. 2. The second cylinder 21 forms a cylinder (a cross section is a polygon and to be a polygon of which an inside is void, but the invention includes these shapes in a cylinder) by 8 pieces of an axial direction cycling belt 22a, 22b, 22c, 22d, 22e, 22f, 22g, 22h. An axial direction cycling belt 22a is shown by return of cycling in 22a-2 and return of cycling of a cycling belt 22b in 22b-2. A cylindrical rubber sheet 2 is formed by wrapping a ribbon 1 to the second cylinder 21 formed of this axial direction cycling belt 22.

FIG. 4 is a side view illustrating a whole of a manufacturing apparatus for a cylindrical rubber sheet including a first cylinder, a second cylinder and a cord supply guide. The second cylinder 21 is put in parallel having the same cylinder axis in an inside of the first cylinder 11 and the cylinder diameter of the second cylinder 21 is smaller than that of the first cylinder 11. A ribbon 1 which is a parallel body of rubber coated cords is wound to the first cylinder 11 through a cord supply guide 31 combined with a gripper. In the cord supply guide 31 is provided with an air cylinder 32 and the cord supply guide 31 gripped a ribbon 1 at a time of starting approaches a surface of the second cylinder 21 to be able to join a ribbon 1. Also, the cord supply guide 31 is connected to a screw 34 rotated by a motor 33 and is able to move to a cylinder axis direction on a side surface of the first cylinder 11 and the second cylinder 21. By movement of a cylinder axis direction of this cord supply guide 31, a ribbon 1 is wound on the first cylinder putting on a spiral cycle belt 15 (omitted in FIG. 4) orderly on the first cylinder 11. The spiral cycling belt 15 rotates a small rollers group 13 by gear 36 driven by a motor 35 and velocity of the spiral cycling belt is defined.

A cord supply guide in FIG. 4 was illustrated by an example in a case of combining a gripper. It is preferable that a roller guide 27 is installed in a step transferring a ribbon 1 from the first cylinder 11 to the second cylinder 21 and the roller guide 27 also can be perceived as one shape of the cord supply guide. The roller guide 27 can combine with a presser tool pressing cylindrical rubber 2. In addition, preferably a cord cutter 37 is installed also in a cord supply guide 31.

FIG. 5 is a side view of an apparatus illustrating an example of a means to change a cylinder diameter D of second cylinder 21 in FIG. 2. As a drawing of upper half and lower half is symmetrical, it describes the upper half but the lower half is the same. An axial direction cycling belt 22a (shown in a chain line) installed in an outside of the second drum 28 is formed to cycle among a roller 41a, 42a, 43a, 44a and 45a.

The roller 41a is supported by a rail 46a. A front edge of the second drum 28 is a tapered shape and is supporting a mount 49 through a slide member 47 and 48. The mount 49 supports a shaft 46a through a skid 50a and 51a. A front edge of the second drum 28 is a screw 52 and a double nut 54 is provided across a flange 53. By tightening the double nut 54, the mount 49 is pushed in sliding a tapered portion; as a result, a diameter D of the second cylinder 21 is widened. When the diameter D shall be reduced, it is realized by rotating the double nut to loosing side.

A step to be manufactured of a cylindrical rubber sheet 2 of the invention is described separating into (a) and (b) of FIG. 6, (c) and (d) of FIG. 7, and it is shown by a cross sectional view of an apparatus in each step. In (a) of FIG. 6, a ribbon 1 gripped by a cord supply guide 31 is attached on an axial direction conveyer belt 22 forming the second cylinder 21 guided by an arm of 55 of an air cylinder 32. In (b) of FIG. 6, a ribbon 1 attached on an axial direction conveyer belt 22 is pressed on a second cylinder 21 guided by roller guide 27. The roller guide 27 is united with a pressing roller 56 and is activated by an air cylinder 57. At this time, a cord supply guide 31 performs a role as a groove shaped yarn guide and is away from the second cylinder unlocking gripping status.

In (c) of FIG. 7, a cord supply guide 31 has been moved to the first cylinder 11 site by a screw 34 and a ribbon 1 shows a winding status to the fist cylinder 11. And at the same time, the ribbon 1 wound on the first cylinder 11 shall be wrapped on the second cylinder 21 by rotation of the first cylinder 11. In (d) of FIG. 7, a ribbon 1 supplied to the cord supply guide 31 is cut in gripped status by grip action of a cord supply guide 31. At this time, the ribbon 1 wrapped around the first cylinder 11, the same as a case of (d) of FIG. 7, shows transferring status from the first cylinder 11 to the second cylinder 21. As the ribbon 1 being supplied is cut, when the ribbon 1 wound on the first cylinder 11 is all transferred to the second cylinder and all becomes a cylindrical rubber sheet 2, a cylindrical rubber sheet 2 of a certain length have been manufactured.

FIG. 8 shows an example that a rubber coat step coating rubber to cords and a forming apparatus of a cylindrical rubber sheet shown in FIG. 4 are connected in a side view of an apparatus. Cords 61 applied adhesive coating treatments to rubber are unreeled from bobbins 63 set up in a creel stand 62 and are led to a die 66 of a rubber extruder 65 by way of a turn roller 64a and 64b. Unvulcanized rubber is extruded by the rubber extruder 65, unvulcanized rubber is coated on cords 61 by the die 66 and is become a ribbon 1. Rubber coating of the ribbon 1 is usually conducted preheating a cord frequently and preferably preheated by heating a turn roller 64a and 64b. The ribbon 1 is led via a tension adjusting device 67 (combining with an accumulator) to a manufacturing apparatus for a cylindrical rubber sheet consists of the first cylinder 11 and the second cylinder 21 through cords supply guide 31. In manufacturing apparatus for a cylindrical rubber sheet shown by FIG. 4, the cylindrical rubber sheet 2 is formed, after cut through by a cutter 30, becomes a continuous body of a rubber sheet reinforced with cords 3 and are led directly to a body-ply forming drum or a belt forming drum of a tire molding apparatus.

FIG. 9 shows an example that a manufacturing apparatus A and B of the invention are disposed parallel. In an apparatus A, wrapping on both cylinders has already finished, after a foregoing part of a ribbon 1 gripped by a cord supply guide 31 is cut, a status that the ribbon 1 on the first cylinder 11 is moving to the second cylinder 21 (a status of (d) of FIG. 7) is illustrated. The ribbon 1 being sent from an extruder side is gripped by a cord supply guide 31, and is transferred to an apparatus B on a rail 71 uniting an air cylinder 32 and a cord supply guide 31. In an apparatus B, a status of (a) of FIG. 6 that an apparatus starts to operate is illustrated attaching ribbon 1 to the second cylinder 21. In this manner, providing plural manufacturing apparatus for a rubber sheet reinforced with a cord, it is possible to increased productivity by producing switching an apparatus one after another without stopping a ribbon being supplied from an extruder side.

A of FIG. 10 illustrates the status that a cylindrical rubber sheet 2 to be a body-ply material of a radial tire is cutting through, an angle α that a cord in this case forms to a rubber sheet of a longitudinal direction, when a width of a ribbon 1 is small and a wrapping angle θ on a conveyer of the second cylinder can be ignored, is a right angle that is 90 degree and is the width R=πD (D is a diameter of the cylinder) of the body-ply. In this case, a cylinder rotates slightly only a amount to correct a wrapping angle θ of a cord. B of FIG. 10 illustrates a status to be a continuous body of a rubber sheet reinforce with a cord 3 to be an arrangement angle α of a cord cutting through a cylindrical rubber sheet by a cutter according to rotating a cylinder itself. In the invention, a wrapping angle θ in the second cylinder 21 becomes large as the width of the ribbon 1 can be widened but it can be adjusted by a rotation of the second cylinder 21. As shown in C of FIG. 10, it is defined by a wrapping angle θ on a conveyer, width w of ribbon, a diameter of D the second cylinder, rotation number m of the first cylinder, velocity of a conveyer, rotation number n of the second cylinder, etc.

EXAMPLE 1

Using a manufacturing apparatus illustrated in FIG. 4 and FIG. 8, an example of manufacturing of body-ply material for an automobile tire by polyester cord is illustrated. Unreeled ten pieces of polyester cords of 1100 dtex/2 applied dipping treatment to obtain adhesiveness to rubber. The cord group is rubber coated passing through unvulcanize composition rubber extruded from a rubber extruder of 60 mm diameter and made a ribbon of 10 mm width. This ribbon is attached on a conveyer of the second cylinder through a cord supply guide. In the first cylinder a spiral cycling belt is cycling and the cylinder outside diameter (the widest portion as it is a polygonal pyramid) of the first cylinder is 450 mm. Also, the second cylinder is set up 8 pieces of conveyer to be a polygon and a conveyer that an axial direction cycling belt composes is running by 1.15 m/min to an axial direction from a cord supplying side. The outside diameter of the polygon was 131 mm. The wrapped ribbon to the first cylinder rotating with rotation number of 33.5 times/min forms a cylindrical rubber sheet continuously wrapping ribbon to the second cylinder by transferring from the first cylinder to the second cylinder. At this time, it was wrapped on a conveyer and a spiral wrapping angle θ was 1.5 degree. A cylindrical rubber sheet being sent on this conveyer by cutting away at a right angle by a cutter (a razor blade) where it came out of a conveyer, a sheet of 412 mm width could be continuously obtained and was a sheet disposed an angle α of a cord to a sheet longitudinal direction in 90 degree (refer to the apparatus A of FIG. 10). A rotation direction of the second cylinder is the reverse to a rotation direction of the first cylinder and rotating slowly to correct 1.5 degree which is spiral wrapping angle θ. A rubber sheet arranged cords at a right angle is used in a tire molding machine as body-ply material for an automobile tire.

EXAMPLE 2

Using an apparatus illustrated in FIG. 4 and FIG. 8, an example of manufacturing belt material for an automobile tire by steel cords is illustrated. 8 pieces of (2+2)×0.25 steel cords twisted together with a wire of 0.25 mm diameter plating treated to obtain adhesiveness with rubber were unreeled. The cord group is rubber coated passing through unvulcanized composition rubber extruded from rubber extruder of 60 mm diameter and made ribbon of 10 mm width. And the ribbon is led to a cord supply guide the same as Example 1. At the first cylinder, a spiral cycling belt is cycling, the outside diameter of the first cylinder is 450 mm and rotates at rotation number of 33.5 times/min. A ribbon wrapped to this first cylinder, according to transferring from the first cylinder to the second cylinder, is wrapped on a conveyer that a ribbon is formed by an axial direction cycling belt and a cylindrical rubber sheet is formed. This spiral wrapping angle θ was 1.4 degree. The conveyer composing this second cylinder was disposed small rollers group of 8 pieces to be a polygon, a conveyer formed by an axial direction cycling belt was running from a cord supplied side to an axial direction at 0.57 m/min and the outside diameter of the polygon was 128 mm. The rotating direction of the second cylinder was the reverse direction to the rotation direction of the first cylinder. A cylindrical rubber sheet being sent on this conveyer, by cutting away to 28.5 degree against a cylindrical axis by a cutter (a rotating blade and a receiving roller) where it came out a conveyer, it was possible to obtain a sheet of 194 mm width continuously and was a sheet disposed a inclination angle α of a cord in 27 degree to longitudinal direction of a sheet (refer to the apparatus B of FIG. 10). The rubber sheet for reinforcing disposed cords obliquely is used in a tire molding machine as the first belt of belt material for an automobile tire.

EXAMPLE 3

As an alternative example of above Example 2, a rotation direction of the second cylinder can be the same as the rotation direction of the first cylinder. This cut away sheet can obtain belt material forming a symmetry angle against a longitudinal direction to a sheet with a cord angle of belt material of Example 2 and is used for the second belt of belt material for an automobile tire. If aforementioned Example 2 is for the first set of a rubber sheet manufacturing apparatus and this Example 3 is for the second set, the first belt and the second belt for an automobile tire can be obtained alternatively.

While preferred embodiment of the present inventions have been described using specific terms, such description is for illustrative purposes only, and it is to be understood that changes and variations may be made without departing from the spirit or scope of the following claims.

The invention claimed is:

1. An apparatus for manufacturing a cord-reinforced rubber sheet which is comprised of a rubber coated cord group including a plurality of cords configured in a form of a ribbon, the apparatus comprising:

a first cylinder having a first cylinder diameter collectively defined by a plurality of generally parallel peripherally arranged rollers configured for receiving the ribbon, in wrapped engagement about the first cylinder diameter, by rotation of the first cylinder about a centrally disposed cylinder axis;

a second cylinder which is coaxial with said first cylinder, said second cylinder having a second cylinder diameter that is smaller than the first cylinder diameter of the first cylinder, said second cylinder being arranged in parallel with said first cylinder in a direction of said cylinder axis, said second cylinder comprising a conveyer including cycling belts which are movable in a direction of the cylinder axis for moving a cylinder surface to a cylinder axis direction, the ribbon being wrapped around a surface of the conveyer by rotation of the first cylinder while a first edge portion of the ribbon wrapped about the first cylinder is joined to a surface of the conveyer, a spiral cycling belt being carried in said first cylinder which cycles spirally about the first diameter defined by said rollers and which is operable to transfer the ribbon wound on the first cylinder to a surface of the second cylinder via said spiral cycling belt so as to form a cylindrical rubber sheet continuously wound spirally in which portions of the ribbon are contacted with each other by moving the surface of the conveyer in the cylinder axis direction; and a cord supply guide connected to a moving device configured to be operable for moving axially in the direction of cylinder axis of the first cylinder and the second cylinder, and for supplying the ribbon to the first cylinder and the second cylinder.

2. An apparatus according to claim 1, wherein the second cylinder is centrally rotatable about the a cylinder axis and is configured to be operable to cut away spirally the cylindrical rubber sheet by rotation of the second cylinder, the second cylinder including a cutter that cuts through the cylindrical rubber sheet so as to form a continuous body of sheet in which is disposed a cord at a predefined angle against a longitudinal direction of a cut away sheet.

3. An apparatus according to claim 1, wherein the cord supply guide includes a rubber coated cord cutter configured to cut the ribbon being supplied after a specific amount of the ribbon is wound on the first cylinder.

4. An apparatus according to claim 1, wherein the apparatus is installed in plural sets, which are formed to supply the ribbon continuously from a one said apparatus to another said apparatus after the ribbon supplied to said one apparatus is cut and so as to manufacture continuously the cylindrical rubber sheet by switching of each said apparatus.

5. An apparatus according to claim 1, wherein the cord supply guide includes a gripper being formed to grip the ribbon supplied to the cord supply guide.

6. An apparatus according to claim 1, wherein the second cylinder is configured to change a diameter of the cylindrical rubber sheet by having a mechanism for changing an outside diameter thereof.

7. An apparatus according to claim 1, further comprising a rubber coating apparatus by which rubber is coated on a cord by passing the cord through a rubber coating die and leading to the cord supply guide, thereby continuously forming the ribbon.

8. An apparatus according to claim 7, further comprising a tension adjustment device being installed between the rubber coating die and the cord supply guide.

* * * * *